(12) United States Patent
Mijiritskii et al.

(10) Patent No.: US 7,706,234 B2
(45) Date of Patent: Apr. 27, 2010

(54) OPTICAL HEAD WITH SWITCHABLE DIAMETER OF THE RADIATION SPOT ON THE RADIATION DETECTOR

(75) Inventors: Andrei Mijiritskii, Zaltbommel (NL); Sjoerd Stallinga, Eindhoven (NL); Bernardus Hendrikus Wilhelmus Hendriks, Eindhoven (NL); Stein Kuiper, Eindhoven (NL); Albert Hendrik Jan Immink, Eindhoven (NL); Teunis Willem Tukker, Eindhoven (NL); Coen Theodorus Hubertus Fran Liedenbaum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 413 days.

(21) Appl. No.: 11/718,921

(22) PCT Filed: Nov. 11, 2005

(86) PCT No.: PCT/IB2005/053718
§ 371 (c)(1),
(2), (4) Date: May 9, 2007

(87) PCT Pub. No.: WO2006/054215
PCT Pub. Date: May 26, 2006

(65) Prior Publication Data
US 2008/0205241 A1    Aug. 28, 2008

(30) Foreign Application Priority Data
Nov. 16, 2004   (EP)   .................................. 04105799

(51) Int. Cl.
*G11B 7/00* (2006.01)
(52) U.S. Cl. ........................... 369/112.01; 369/112.24; 369/121
(58) Field of Classification Search ....................... None
See application file for complete search history.

(56) References Cited

U.S. PATENT DOCUMENTS

| 5,841,735 | A | 11/1998 | Quazi | |
|---|---|---|---|---|
| 6,130,873 | A | 10/2000 | Lazarev et al. | |
| 6,342,976 | B1 | 1/2002 | Nomura et al. | |
| 2003/0053394 | A1* | 3/2003 | Park et al. | 369/112.05 |
| 2003/0147331 | A1 | 8/2003 | Lee | |
| 2004/0120242 | A1* | 6/2004 | Kim et al. | 369/112.17 |

FOREIGN PATENT DOCUMENTS

| EP | 1376553 B1 | 3/2008 |
|---|---|---|
| JP | 08124206 | 5/1996 |
| JP | 09167364 | 6/1997 |
| JP | 10177738 | 6/1998 |

(Continued)

*Primary Examiner*—Paul Huber

(57) ABSTRACT

In an optical scanning device (10) capable of scanning an information plane of an optical record carrier (5) of different types such as BD, DVD and CD, the diameter of the radiation spot on the detector (7) is dependent on the numerical aperture of the objective system (4) that is used for scanning the record carrier An optimal design of the optical detection system for scanning a BD, result in a small radiation spot for the other types such as DVD and CD. By implementing an optical element (13) that increases the diameter of the radiation spot in the situation a DVD or CD is scanned, the influence of stray light is reduced and the tracking signals are improved

32 Claims, 2 Drawing Sheets

FOREIGN PATENT DOCUMENTS

| | | |
|---|---|---|
| JP | 2000155976 | 6/2000 |
| KR | 2001066371 | 7/2001 |
| WO | 03060891 A2 | 7/2003 |
| WO | 03069380 A1 | 8/2003 |
| WO | 2004038480 A1 | 5/2004 |
| WO | 2004051636 A2 | 6/2004 |

* cited by examiner

OPTICAL HEAD WITH SWITCHABLE DIAMETER OF THE RADIATION SPOT ON THE RADIATION DETECTOR

This application is a 371 of PCT/IB05/53718, filed Nov. 11, 2005.

FIELD OF THE INVENTION

The present invention relates to an optical scanning head suitable for reading or recording record carriers of various formats. The invention also relates to an optical storage system using the optical scanning head.

BACKGROUND OF THE INVENTION

With growing demand for higher storage capacities in optical recording systems new storage systems are being developed over CD (Compact Disc) and DVD (Digital Versatile Disc). The Blu-ray Disc (BD) is such a new storage system. Where a CD can store some 650 MB and the DVD some 4.7 GB per 12 cm diameter disc, the BD can already store some 27 GB on a 12 cm disc. For further increase in data storage capacity of a disc multi-layer media have been developed for DVD and also for BD. Such media contain, for example, two data layers, which are separated by a spacer layer. Each layer can be accessed through the same entrance surface of the record carrier.

The main differences from an optical point of view between these generations of optical disc systems are the wavelength of the radiation source and the numerical aperture of the objective system that focuses the radiation beam onto the data layer. For CD the wavelength is typically 785 nm and a numerical aperture (NA) of 0.45 is used, while for DVD this is about 660 nm and 0.60, and for BD about 405 nm and 0.85, respectively. To bridge all these different optical storage systems compatible optical scanning heads are being developed that are capable of reading and recording discs of the different optical recording system generations. When designing such compatible optical scanning heads it is desirable to use a single light-path and a single radiation detector as this leads to an optical head with fewer optical elements and, therefore, would be cheaper and more competitive.

Due to the difference in NA of the objective lens system for each application (CD, DVD or BD) also the NA of the returning radiation beam towards the radiation detector will be different. This implies that the diameter of the spot focused onto the photo-detector is also proportional to the NA. For example, a diameter of the radiation spot of 70 µm on the photo detector for a BD application with the astigmatic focusing method may use a typical photo-detector with dimensions of 200 µm by 100 µm, while the diameter of the radiation spot for the DVD application is about 54 µm and for the CD application only about 37 µm.

A problem arises when beamlanding occurs i.e. the detector and light spot are mutually displaced in the lateral direction due to for example mechanical stress, misalignment during manufacturing of the optical head or thermal instabilities in the optical scanning head. This beamlanding has deteriorating effects on the quality of the focusing and tracking signals of the scanning system. Beamlanding errors of up to 10-15 µm are common in optical scanning heads. For the DVD and CD application of the system such beamlanding values are relatively large with respect to the diameter of the radiation spot of respectively about 54 µm and 37 µm.

Another problem occurs when the system is reading dual-layer DVD discs. The radiation beam is focused by the objective system on one of the two information layers for reading out the data. The reflection at the other layer not being in focus causes a secondary spot on the radiation detector. This secondary spot has a much larger area on the radiation detector as it is out of focus at the record carrier, but a portion of the light distribution is still captured by the sensitive areas of the radiation detector. This secondary spot can be considered as unwanted stray light, as it may affect a robust focusing and tracking signal generation. In U.S. Pat. No. 5,841,735 the requirements for detector dimensions in relation to multi-layer disc are described. But the fixed detector dimensions optimized for the BD application, lead to a mismatch of such requirements and result in a large portion of stray light on the radiation detector for the dual-layer DVD application of the system that may result in reduction of the readout and recording performance of the system in the DVD application.

JP 10-177738 discloses a two-objective-lens actuator for a DVD-CD compatible optical scanning head with specific requirements on the relation between the numerical apertures and focal lengths of both objective lenses such that the numerical aperture of the radiation beam towards the radiation detector, thus the size of the focused spot on the radiation detector, is about the same for both the DVD as well as the CD application. When the optical scanning head also needs to be compatible with a third generation optical record carrier, such as BD, the proposed solution requires three lenses in the actuator. This will make the actuator head more complex and costly. It also increases the mass in the actuator, which limits the bandwidth of the actuator system, resulting in a limitation of the readout speed of record carriers. Also the possibility to use the solution in a 3D-actuator will become much more complex. A 3D-actuator is used for focusing and radial tracking of the record carrier as well as for the correction of record carrier tilt (usually in the radial direction). Such a 3D-actuator is commonly used in DVD systems.

It is an object of the invention to provide an optical scanning head (and its application) suitable for readout and/or recording of multiple record carrier generations without impact on the actuator performance and solving one or more of the above-mentioned problems.

SUMMARY OF THE INVENTION

An optical scanning device for scanning an optical record carrier having an information layer, comprising a radiation source for generating a radiation beam, an optical system having a forward optical path having a forward magnification comprising an objective lens for focusing said radiation beam onto an information layer and a return optical path having a return magnification for transmitting radiation reflected by the information layer to a radiation detector, the return optical path having a return magnification, and furthermore a means for varying and adjusting the return magnification without substantially affecting the forward magnification.

Varying the return magnification is to be interpreted in both a passive as well as active mode. In a passive mode the variation may be due to, for example, a dependency on the wavelength of the radiation beam when the means for varying the return magnification comprises e.g. diffractive optical elements.

Also a dependency of the means for the polarization direction of the radiation beam may be considered to be an example of a variation in the passive sense.

The active mode is to be considered to comprise an adjustable feature in the means for varying the return path magnification.

Using the invention a single, multi-disc-format compatible objective lens can be used for focusing a radiation beam on the information layer or layers of the optical record carrier.

The return path magnification of the optical system is a determining parameter for the size of the spot of the radiation beam onto the surface of the radiation detector.

An optical scanning system suitable for scanning an information layer of a BD and a DVD may, for example, be optimized with respect to radiation detector dimensions for use with BD, in which case the radiation detector dimensions will be larger than actually needed for use with a DVD as the size of the spot in that case is smaller than in case of the BD. By increasing the size of the spot on the radiation detector by decreasing the return path magnification in the DVD application to about the same dimension as the size of the spot on the radiation detector in the BD application, problems concerning stray light due to multilayer DVD readout or beamlanding are reduced as relatively less stray light will fall onto the radiation detector. In case the scanning device is used in combination with a CD, the size of the spot may also be increased to match, for example, requirements considering the lateral positioning of the spot onto the radiation detector, also often referred to as beamlanding.

In a preferable embodiment the optical scanning device according to the invention is also comprising a beam splitter for separating the radiation emitted by the radiation source from the radiation reflected by the information layer, and the means for varying or adjusting the return path magnification is located between the beam splitter and the radiation detector.

As in this embodiment the means for varying the return path magnification is not passed by the radiation beam in the forward path, it has no direct impact on the radiation beam in the forward path.

In another preferable embodiment the means comprises an optical device having an adjustable focal length.

When both return path magnification and focus position can be varied or preferably be adjusted, it is possible to correct for focus errors that may be introduced while varying or adjusting the magnification. An additional focus position adjustment may also be used to improve readout performance or recording performance, such as jitter, of the optical scanning device.

In an embodiment of the invention the means for adjusting the return path magnification and the focus position comprises an electrowetting lens. By applying a voltage to an electrowetting lens the shape of the meniscus between the two fluids can be altered, resulting in different optical characteristics of the electrowetting lens. Preferably the electrowetting lens comprises two menisci, making it possible to introduce a zooming-function in the means, resulting in the possibility to change magnification while maintaining proper focus position.

These and other aspects of the invention will be explained further with reference to the below figures.

DETAILED DESCRIPTION OF THE PREFERRED EMBODIMENTS

Figure 1:
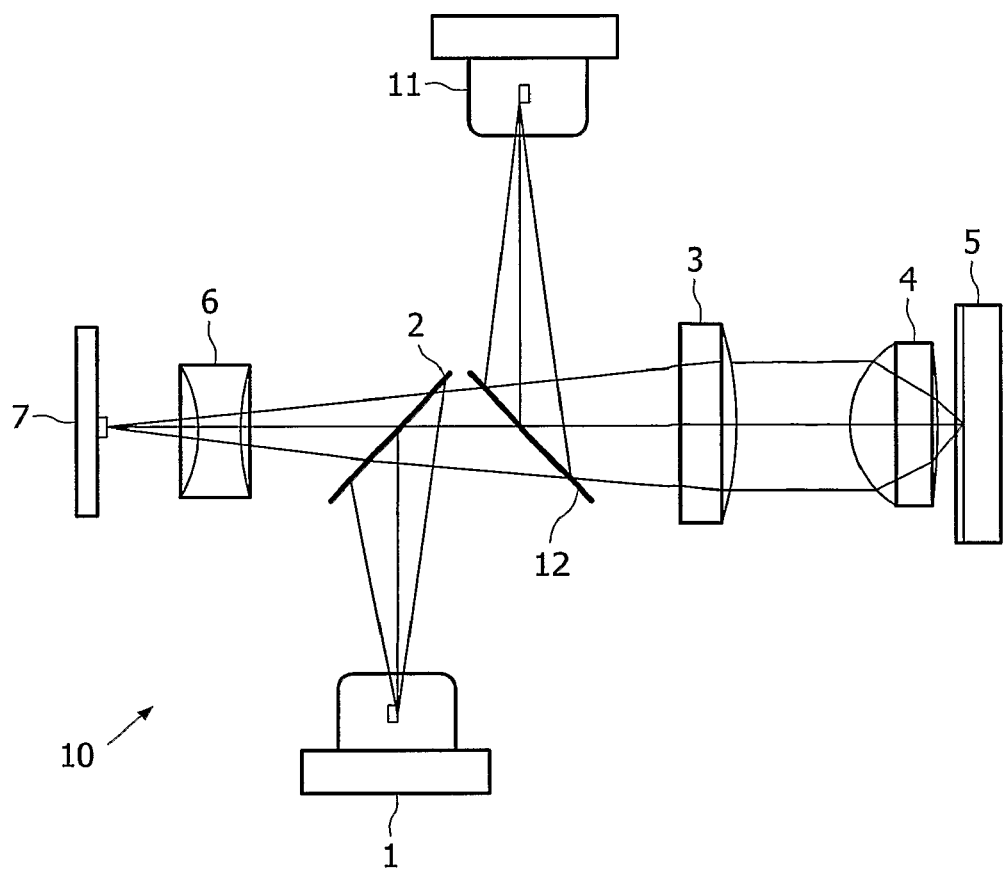
FIG. 1 shows a schematic representation of a conventional optical scanning device.

In FIG. 1 a schematic representation of an example of an optical scanning device 10 suitable for reading and recording optical record carriers of two different optical record carrier formats, such as BD and DVD or DVD and CD, is shown. Radiation source 1, e.g. a semiconductor laser, emits a light beam with, for example, a wavelength of about 405 nm to be used for the BD readout. A beam splitter 2 is used for separating the radiation beam emitted by the radiation source from the radiation beam reflected by the information layer. Reflected by a beam splitter 2 the radiation beam is forwarded to a collimator lens 3 that transforms the divergent emitted beam into a substantially parallel beam towards an objective lens 4 that focuses the light beam onto an information layer of the record carrier 5. After reflection the light beam is transferred via the objective lens, collimator lens and transmitted through the beam splitter towards the radiation detector 7 via a sensor lens 6. This sensor lens may have some optical power. The sensor lens may also generate astigmatism in the return beam towards the radiation detector for the use of astigmatic focusing method, but also another optical solution such as a tilted plan-parallel plate or diffractive optical element may be used for generating the astigmatism. Here the combination of the collimator lens and sensor lens is used to focus the return beam onto the radiation detector. When the forward beam is focused on an information layer of the optical record carrier and the radiation detector is assembled correctly in the optical scanning device, the radiation spot formed on the photo detector is the circle of least confusion between both focal lines as generated in the optical scanning device using the astigmatic focusing method.

Lenses as described in this application such as, for example, an objective lens or collimator lens may comprise a single optical element or multiple optical elements (lens system).

For readout of a disc with a different format, such as DVD or CD, it is possible that another radiation source 11 having a different wavelength is used. For DVD usually a wavelength of about 660 nm is applied, while for CD the usually applied wavelength is about 785 nm. This radiation beam is reflected by beam splitter 12 towards the collimator lens 3 and focused by the same objective lens 4 as used for the readout of the BD.

The objective lens 4 may be a BD-DVD or BD-DVD-CD compatible objective lens or system such as, for example, described in WO2004/051636 and WO2003/060891 (or B. H. W. Hendriks et al., Proc. Optical Design and Fabrication 2000, p.325 and B. H. W. Hendriks et al., Appl. Opt. 40, p. 6548 (2001)) to obtain compatibility for readout/recording on such different disc formats.

The diameter of the radiation spot $\phi$ focused onto the radiation detector 7 is dependent on the distance $\Delta f$ between the two focal lines, the numerical aperture NA of the objective lens 4 used for focusing onto an information layer of the record carrier, as well as the return path magnification M from the record carrier to radiation detector. This relation may be presented by $$\phi = \Delta f \cdot NA / M \quad (1)$$

The return path magnification is determined by the characteristics of the optical components in the return optical path. For the optical layout of FIG. 1 these optical components are the objective lens 4, the collimator lens 3 and the sensor lens 6.

When using the same collimator lens 3 in both optical paths of radiation source 1 and radiation source 11, the effective numerical aperture of the collimator lens as used with that radiation source is determined by the effective pupil diameter of the objective lens 4 when scanning the record carrier format corresponding to that radiation source. Therefore, the effectively used numerical aperture of the collimator lens scales with the numerical aperture of the objective lens as used for scanning the record carriers of the different formats.

The diameter of the radiation spot $\phi_i$ can therefore be written as $$\phi_i \Delta f \cdot NA_i / M_1 \quad (2)$$

in which $M_1$ is the return magnification when scanning a first record carrier with a numerical aperture $NA_i$ of the objective lens and $\phi_i$ is the diameter of the radiation spot when scanning an $i^{th}$ record carrier with a numerical aperture $NA_i$ of the objective lens.

Figure 2A:
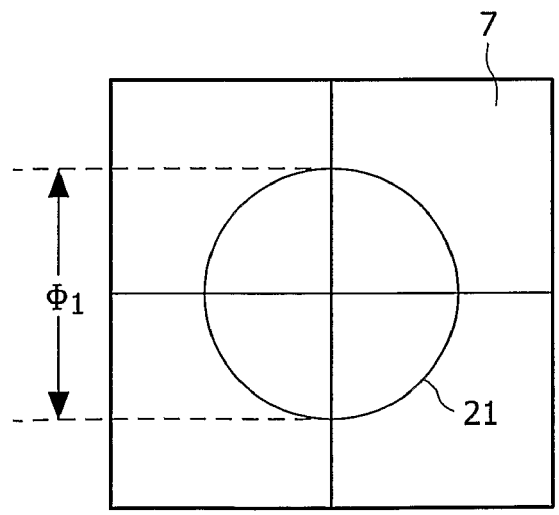
FIG. 2 show the schematics of a light spot formed onto a radiation detector for the situation (A) where the conventional optical scanning device is used in the BD application and situation (B) when the conventional optical scanning device is used in the DVD application.
Figure 2B:
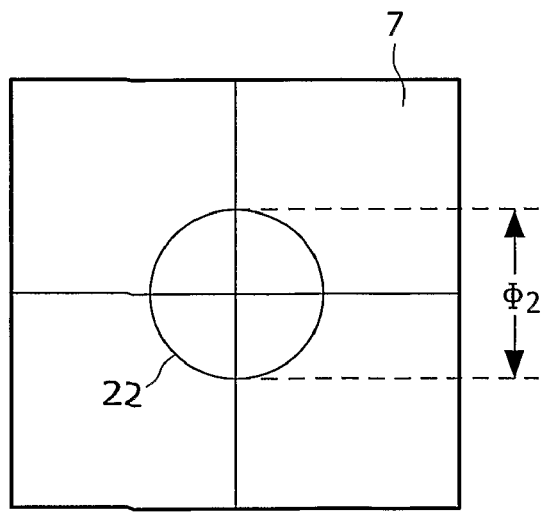

FIGS. 2A and 2B illustrate the different spot diameters on the radiation detector in case of readout of different disc formats using different numerical apertures at the objective lens. For BD the generally applied numerical aperture of the objective lens 4 is about 0.85; for DVD this is about 0.60 and for CD this is about 0.45. When a first record carrier is being scanned with a first numerical aperture $NA_1$ of the objective lens required for focusing onto an information layer, the radiation spot 21 formed on the radiation detector will have a diameter $\phi_1$. Similar, when a second record carrier is being scanned with a second numerical aperture $NA_2$ being smaller than $NA_1$, the resulting radiation spot 22 on the radiation detector 7 will have a diameter $\phi_2$, which is a factor $NA_2/NA_1$, times the diameter $\phi_1$ of the radiation spot 22 in case of the first record carrier.

In case of the first record carrier being a BD and the second record carrier being a DVD, the diameter $\phi_2$ of the radiation spot on the radiation detector for DVD will be about 0.7 times the diameter $\phi_1$ of the radiation spot with BD. When the radiation detector is designed to match the dimensions of the radiation spot for BD having a diameter $\phi_1$, the radiation detector dimensions are larger than needed when used in combination a DVD having a radiation spot with diameter $\phi_2$. These larger radiation detector dimensions increase the influence of stray light on the robustness of focusing and tracking of the scanning spot on the information layer being scanned.

A similar argumentation can be given for the case in which the radiation spot dimension on the radiation detector for BD is compared with that of CD, in which case the spot diameter on the radiation detector during scanning of the CD is about 0.5 times that of the spot diameter on the radiation detector when scanning a BD.

The effects of displacement of the radiation detector on the tracking signals or influence of the stray light on e.g. offsets is becoming larger when the diameter of the spot on the radiation detector are smaller. It is therefore preferable to adapt the diameter of the radiation spot to match the dimensions of the radiation detector that is used for generating the tracking signals, such as radial tracking signal and focus signal.

According to the inventions the adaptation of the spot diameter can be achieved by adapting the magnification M. When a first record carrier is scanned using a numerical aperture $NA_1$ in combination with a magnification $M_1$ and a second record carrier is scanned using numerical aperture $NA_2$ being smaller than $NA_1$, the magnification $M_2$ should be $NA_2/NA_1$ times $M_1$ in order to obtain substantially equal radiation spot diameters $\phi_1$ and $\phi_2$.

As is shown in formula 1, it is also possible to adapt the distance $\Delta f$ between the focal lines when scanning record carriers of different format.

According to the invention, adding an adjustable optical element into the optical light path that can alter the magnification M and/or distance $\Delta f$ between the two focal lines, the diameter of the radiation spot on the radiation detector can be made substantially the same independent of the NA of the objective lens system used for scanning the record carrier.

A BD/DVD compatible optical scanning device may be designed in such a way that the radiation detector dimensions are optimized to the dimensions of the radiation spot when scanning a BD. To obtain a substantially equal diameter of the radiation spot while scanning a DVD as while scanning a BD, the magnification M of the return path needs to be reduced or focal line distance $\Delta f$ increased to enlarge the diameter of the radiation spot on the radiation detector.

It may also be possible to optimize the design for the DVD application and reduce the diameter of the radiation spot when used in a BD application by reducing the focal line distance $\Delta f$ or increase the return path magnification M. This may have an additional benefit when used in the BD application with respect to the achievable bandwidth of the readout signals, as such a bandwidth is also depending on the size of the radiation detector area: a larger radiation detector area generally results in a higher capacitance and therefore lower bandwidth.

When the optical scanning device is designed to be compatible for scanning BD, DVD and CD, the preferred design will be based on scanning a DVD or more preferred on scanning a BD and that the magnification in case of scanning a CD will be reduced to enlarge the diameter of the radiation spot on the radiation detector, for example to reduce problems related to the focusing and tracking servo signals related to beamlanding.

The magnification from radiation source 1 to the record carrier 5 may be the same or different as the magnification from record carrier 5 to radiation detector 7, by using for example positive or negative optical power in the sensor lens 6, or apply additional optical elements with optical power between the radiation source 1 and the beam splitter 2.

When changing the magnification in the common optical path, e.g. between the beam splitter 2 and the record carrier 5, both the magnification from radiation source to record carrier as well as the magnification from record carrier to radiation detector change. The common optical path being the radiation path that is used for both directing the radiation beam from the radiation source towards the optical record carrier as well as used by the radiation beam when reflected by the record carrier towards the photo detector.

Preferably only the return magnification is adapted such that the magnification in the radiation beam towards an information layer on a record carrier is not affected. A change of magnification of this forward path may, for example, result in a different effective numerical aperture of the collimator 3, thereby affecting the rim-intensity of the radiation beam in the radiation beam in the objective lens 4. When the magnification from radiation source to information layer is adapted, the dimensions of the scanning spot may be altered, which can have impact on the readout performance of the optical scanning device.

Figure 3:
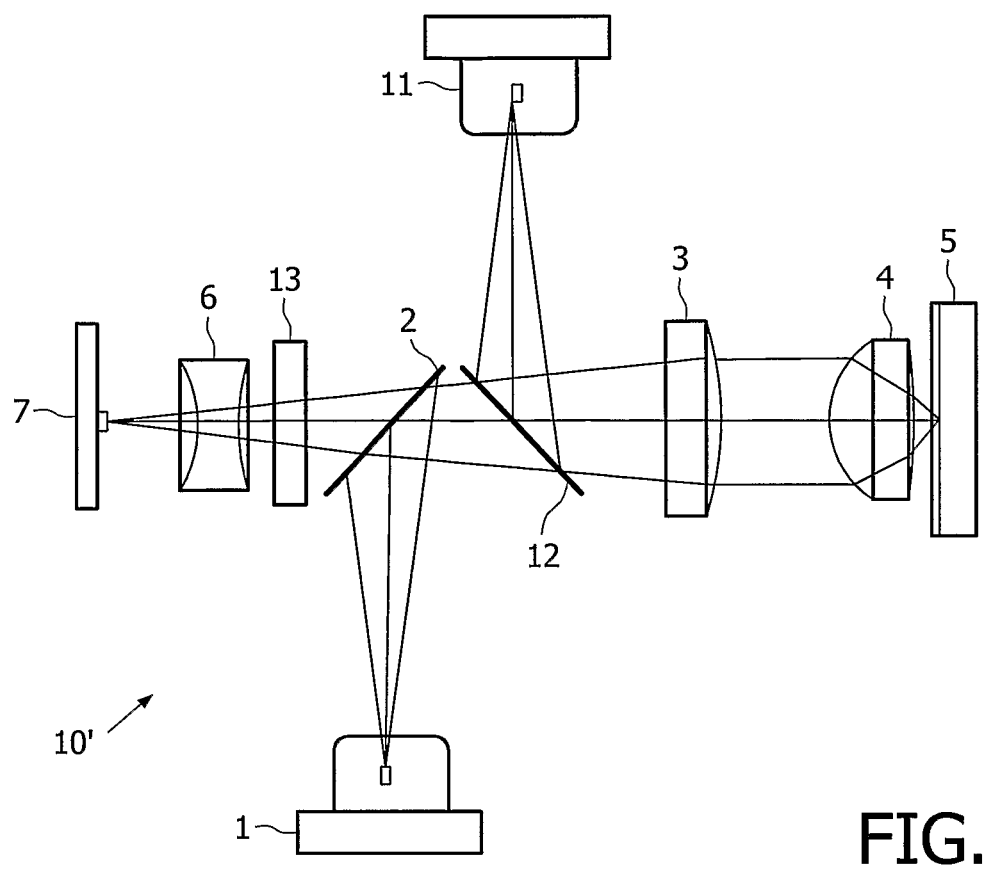
FIG. 3 shows a schematic representation of an optical scanning device according to an embodiment of the invention.

FIG. 3 schematically shows an embodiment of the invention for an example of an optical scanning device 10' comprising two radiation sources 1 and 11, e.g. a 405 nm semiconductor laser for BD readout and a 660 nm semiconductor laser for DVD readout. The references of the components are the same as for the corresponding components in FIG. 1. However, the specific characteristics of the corresponding components in FIG. 3 and FIG. 1 may be different (for example, different coatings, different radiation wavelength, etc.). The radiation beam emitted by radiation source 1 is reflected by beam splitter 2 and transmitted trough the beam splitter 12 towards to record carrier. The radiation beam emitted by radiation source 11 is reflected by the beam splitter 12 towards the record carrier.

The means for adjusting the magnification 13 is located in the return optical path between the radiation detector 7 and the beam splitter 2. It may be located at either side of the sensor lens 6. When the means 13 is located between the sensor lens 6 and the radiation detector 7, the beam diameter in the means 13 will be smaller than when the means 13 is located between the sensor lens 6 and the beam splitter 2, which may be preferable when making use of, for example, electrowetting or liquid crystal devices in the means 13. The means for adjusting the magnification 13 may also comprise the sensor lens functionality and/or the generation of astigmatism, such that a separate sensor lens is not required.

When the design of return path of the optical scanning device is optimized for scanning a BD with respect to, for example, the radiation detector dimensions, the means 13 may be in a non-active mode when the device is used for scanning a BD with the radiation beam generated by laser 1, as no adjustment of magnification, hence the diameter of the radiation spot, may be required. When the scanning device 10' is used for scanning a DVD with the radiation beam generated by laser 11, the resulting diameter of the radiation spot on the radiation detector will be smaller (according to formula (1)) due to the smaller numerical aperture used for the scanning the DVD. By activating the adjustment means 13 in an active mode, the return path magnification can be reduced. Hence, the diameter of the radiation spot can be enlarged, for example, to a substantially same diameter of the radiation spot as when occurs while scanning the BD with radiation source 1. The effects of, for example, beamlanding as well as cross talk due to dual layer disc readout are then reduced, resulting in higher quality focusing, tracking and data signals. The use of different wavelengths such as described above is not needed, as commonly used record type recognition methods can also be used in combination with the controls for the means adjustment of the magnification 13.

In an embodiment of the invention the means for adjusting the magnification 13 comprises a variable focus lens based on electrowetting. It is noted that the principles of a variable focus lens are described in detail in patent applications WO2003/069380 and WO2004/038480. Changing the applied voltage to an electrowetting device may change the shape and/or position of the meniscus; hence, a changeable meniscus is obtained.

The variable-focus lens based on an electrowetting device may make use of a single changeable meniscus or variable-focus lens element, but preferably the variable-focus lens comprises two changeable menisci in order to keep the radiation spot in focus on the radiation detector while changing the magnification. In the latter case substantially no focus offset may be introduced in the focusing servo signal. This means that the variable-focus lens preferably should act as a zoom lens.

Figure 4:
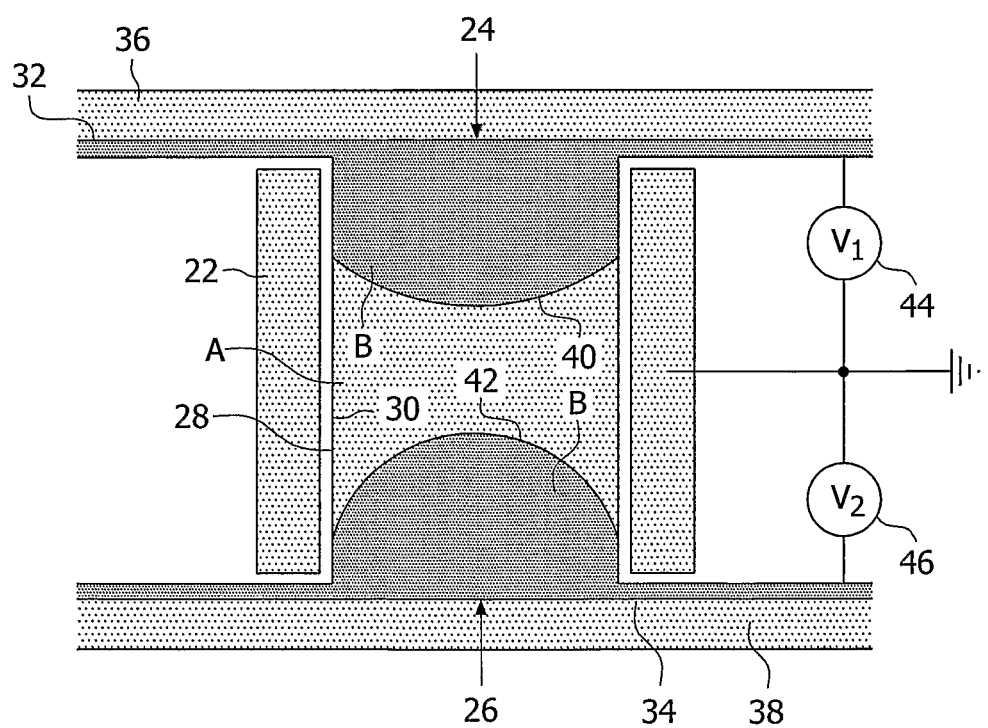
FIG. 4 shows a cross-section of a possible configuration of a variable focus lens with a controllable lens portion according to another embodiment of the invention The figures are not drawn to scale and are purely schematic. The same reference numbers in different figures refer to the same elements.

FIG. 4 (taken from WO2004/038480) shows an example of a variable-focus lens based on electrowetting, i.e. an electrowetting lens, which the means for adjusting the magnification 13 may comprise. The figure shows a cross-section of a possible configuration for such a variable-focus lens with a controllable lens portion, which portion comprises two variable-focus lens elements 24, 26 based on an electrowetting device. This electrowetting device comprises a cylinder 22 of conductive material. The cylinder is coated with an insulating layer 28. The inner side of the cylinder is provided with a fluid contact layer 30. When the fluid contact layer 30 has sufficient insulating properties, a single insulating fluid contact layer may be used. The conductive cylinder 22 forms a common first electrode for the lens elements 24 and 26. The second electrode of the first lens element 24 is constituted by an annular conductive layer 32 having a central transparent area for passing radiation. A conductive layer 34 at the lower side forms the second electrode of the second lens element 26. A transparent layer 36 and 38 may cover the conductive layers 32 and 34, respectively. The central portion of the cylinder is filled with a first, transparent and nonconductive fluid (liquid or vapor) A. At each side of the fluid A, a second, transparent and conductive or polar, fluid B (liquid or vapor) is present, which fluid has a different refractive index than the first fluid A. The non-miscible fluids at the upper side are separated by a first meniscus 40, which forms the first variable focus lens element. The fluids A and B at the lower side are separated by a second meniscus 42, which forms the second variable focus lens element. The curvature of the menisci and thus the focal distance of the lens elements 24 and 26 can be changed independently from each other by means of controllable voltage sources 44 and 46, respectively. Zooming, i.e. changing the focal distance of the zoom lens is performed by changing the meniscus curvature of the first lens element 24 via adaptation of voltage V1 of source 44. Focusing, i.e. maintaining a sharp image for different zoom configurations is performed by changing the meniscus curvature of the second lens element 26 via adaptation of the voltage V2 of source 46. Zooming-in means that the focal distance of the zoom lens system is increased and zooming-out means that this distance is decreased.

The variable focus lens as described in relation to FIG. 4 comprises a single cylinder or cell with two variable focus lens elements, for generating the zooming function. However, also other configurations are possible, such as a configuration of two cells each comprising a variable focus element based on an electrowetting device.

Alternatively, the means for adjusting the magnification 13 comprises a variable focus lens making use of displacement of an optical element (or optical elements) along the optical axis (so, axially moving) of the optical system as is commonly used for zoom lenses.

In the embodiments described above having a zooming function, there are optical elements for changing the magnification for changing the diameter of the radiation spot on the radiation detector, as well as optical elements having an adjustable focal length for keeping the radiation spot in focus on the radiation detector to prevent introduction of a focus offset in the focusing servo signal.

The zooming of the means 13 may be switchable with one or multiple (discrete) steps between a largest value and a smallest value. The number of steps may depend on the amount of different type of record carriers that are to be scanned and the amount of changes that are required for the magnification. For example, a two steps zoom can be used for a scanning device suitable for scanning BD, DVD and CD. For a BD optimized design of the scanning device these two steps may be: one zooming step from BD to DVD scanning capability and another extra zooming step from DVD to CD scanning capability of the scanning device. But it also may be possible that only a zooming step is required from BD to DVD scanning capability of the scanning device and no additional zooming step is used for CD scanning capability. The skilled person will understand that also other zooming step configurations are possible. The same applies for a means 13 that has only a switchable magnification possibility.

It is more preferred that means 13 has a continuous zooming capability. This has the additional advantage that the performance of the scanning device can be further optimized.

Besides the change of magnification resulting in a change of the diameter of the radiation spot according to the invention, a fine-tuning of the focus may be applied to reduce for example focus offset in the focus servo signal or to optimize the scanning jitter.

With a continuous zooming capability it is also possible to enlarge the radiation spot on the radiation detector, while the scanning device is in focus on the information layer, to a maximum size allowable by the dimensions of the radiation detector. In this situation the possible stray light caused by reflection of the radiation beam (focused on an information layer in the record carrier) on the possible other information layers in the record carrier is reduced.

When the scanning device is optimized for scanning a BD and the means for varying the magnification 13 is used to adjust the magnification for scanning a DVD or CD, the means 13 may also be used to enlarge the radiation spot diameter to fit the dimensions of the radiation detector. This reduces the effects of stray light in case of scanning a BD and thus may increase the scanning performance of the scanning device.

In another embodiment according to the invention, the means for varying the magnification 13 is varying the magnification in dependence of the wavelength of the radiation beam. This is possible when the means 13 comprises, for example, wavelength dependent optical elements such as diffractive optical elements. A holographic lens has a wavelength dependent focal length and therefore can affect the magnification of an optical system. In order to keep the radiation spot in focus on the radiation detector while changing the magnification a second diffractive optical element is preferably introduced. The combination of these two diffractive optical elements then acts as a wavelength dependent zoom lens.

The diffractive optical elements may be active for all wavelengths used in the application, but may also be substantially invisible for one or more wavelength ranges, thus substantially not affecting the light beams towards the radiation detector. This can be obtained by applying for example, diffractive optical elements for which the phase difference introduced by the diffractive structure is an integer multiple of the wavelength of the radiation beam that is not to be affected by the structure.

Alternatively, also an electrowetting device with a dispersive fluid (or fluids) may be used to influence the magnification or the distance Δf between the two focal lines. Using such fluids the optical impact of the electrowetting device on the radiation beam passing the device will also depend on the wavelength of that radiation beam.

In yet another embodiment according to the invention, the means for varying the magnification 13 is varying the magnification in dependence of the polarization of the radiation beam. This is possible when the means 13 comprises a birefringent optical element.

When a first radiation beam has a first polarization direction and a second radiation beam has a second polarization direction, the birefringent optical element may affect the first radiation beam differently then the second radiation beam. Such an optical element may, for example, be a compound lens with a first refractive non-birefringent element cemented to a second birefringent element, for which compound lens there is substantially no difference in refractive index between the first and second element for the first wavelength (e.g. 405 nm) and a substantial difference in refractive index for the second wavelength (e.g. 660 nm), thereby affecting the magnification of the second radiation beam towards the radiation detector. Preferably the polarizations of the first and second radiation beam are orthogonal. As is obvious to the skilled person also other combinations are possible.

Alternatively the means 13 comprises liquid crystal materials. The effect may be in a passive way due to the polarization of the radiation beams passing the means 13, in an active way due to a changing of the orientation of LC material in a switchable LC-cell in means 13, or a combination thereof. The liquid crystal material may be in a single element or a double element to correct for possible defocus of the radiation beam toward the radiation detector.

Also combinations of diffractive and birefringent optical elements are possible to obtain a magnification variation of the radiation beam towards the radiation detector in the optical scanning system, while correcting the possible defocus of the radiation beam towards the detector.

As can be understood by the person skilled in the art, the above described examples and embodiment for the means 13 for varying the return path magnification may also be used for a means for varying the distance Δf between the focal lines in the astigmatic focusing system in order to adapt the diameter of the radiation spot on the radiation detector.

Also a combination of a means for varying the return path magnification with a means for varying the distance Δf between the focal lines in the astigmatic focusing system may be used.

As described in the previous embodiments and examples the means for varying the return magnification or means for varying the distance Δf between the focal lines, may be a passive means (such as a diffractive optical element) or an active means (such as an electrowetting device or switchable LC-cell). An active means requires a control means generating an output signal for activation or switching of the varying means 13. This control means may have, for example, an input signal that is dependent on the type or format of record carrier to be scanned, or that is dependent on the radiation source that is switched on for scanning a record carrier. In dependence of this input signal the control means generates an output signal that switches, activates or varies the means 13 to such a state that the return path magnification is set to the required value or level obtain an a diameter of the radiation spot matching the requirements dimensions of the radiation detector.

As example, when the numerical aperture used for focusing the radiation beam on an information layer is actively adapted by a NA-selection signal in the optical scanning apparatus, the same NA-selection signal may be used as input signal for the control means for the means 13. Other examples are obvious for the person skilled in the art.

It may also be possible to optimize the scanning performance of the scanning device by a fine-tuning of the return magnification or distance Δf between the focal lines.

In an optical scanning device having a design of the radiation detector optimized for the diameter of the radiation spot on that detector while scanning a BD, the diameter of the radiation spot on the radiation detector when scanning a DVD may be enlarged according to the invention. However, it may also be of interest for the scanning performance of the scanning device that the diameter of the radiation spot on the radiation detector while scanning a BD is enlarged (or maximized with respect to the detector dimensions). When the scanning device is correctly focused on an information layer of the BD record carrier, the diameter of the radiation spot on the detector may be enlarged to substantially match the dimensions of the detector. In that case stray light due to reflections on for example other layers in the BD record carrier may be of less influence on the generated tracking signals of the scanning device, e.g. due to cross talk. When the scanning device is to jump to another information layer present in such a multilayer BD record carrier, the extra enlargement of the BD radiation spot on the detector may be switched off before this jump is being activated. Similarly, it may also be advantageous to further enlarge the radiation spot when scanning a DVD record carrier to further reduce the effects of, for example stray light, cross talk and beamlanding.

It should be noted that the invention is not limited to be applied to optical scanning devices using the astigmatic focusing method. The invention is also applicable to other focusing methods, such as for example, the differential spot-size method or Foucault method.

The invention claimed is:

1. An optical scanning device for scanning an optical record carrier in one of an optimized or non-optimized mode, said device having an information layer, comprising
a radiation source for generating a radiation beam,
a radiation detector whose dimensions are optimized to the dimensions of a radiation spot when operating in said optimized mode,
an optical system having a forward optical path and a forward magnification comprising an objective lens for focusing said radiation beam onto the information layer, and a return optical path having a return magnification for transmitting the radiation beam reflected by the information layer to the radiation detector,
means for varying or adjusting the return magnification without substantially affecting the forward magnification, wherein said means operates in one of said optimized or non-optimized mode, and wherein said means reduces the return optical path magnification only in said non-optimized mode.

2. The device of claim 1, comprising a beam splitter (2) for separating the radiation beam emitted by the radiation source from the radiation beam reflected by the information layer, wherein the means is located between the first and second beam splitters and the radiation detector.

3. The device of claim 1, the means comprising an optical device having an adjustable focal length.

4. The device of claim 3, said means comprising an axially movable optical element.

5. The device of claim 1, wherein said means is adapted for varying or adjusting the return magnification further in dependence of said wavelength.

6. The device of claim 5, said means comprises a diffractive optical element.

7. The device of claim 1, the radiation beam having a polarization, said means being adapted for varying or adjusting the return magnification further in dependence of said polarization.

8. The device of claim 7, said means comprising a birefringent optical element.

9. The device of claim 1, said means comprising an electrowetting lens.

10. The device of claim 1, in which said means comprises a variable optical device comprising liquid crystal materials.

11. The device of claim 1, further comprising a beam splitter for separating the radiation beam emitted by the radiation source from the radiation beam reflected by the information layer.

12. The device of claim 11, wherein the diffractive optical element is located between the beam splitter and the radiation detector.

13. An optical recording apparatus for scanning optical record carriers of different format, comprising a device according to claim 1.

14. An optical scanning device for scanning an optical record carrier having an information layer, comprising
a radiation source for generating a radiation beam having a wavelength,
a radiation detector,
an optical system having a forward optical path and a forward magnification comprising an objective lens for focusing said radiation beam onto the information layer, and a return optical path having a return magnification for transmitting the radiation beam reflected by the information layer to the radiation detector,
wherein the device further comprises a diffractive optical element for varying or adjusting the return magnification in dependence of said radiation beam wavelength without substantially affecting the forward magnification.

15. The device of claim 14, wherein the diffractive optical element has an adjustable focal length.

16. The device of claim 14, wherein the diffractive optical element is axially movable along the return optical path.

17. An optical scanning device for scanning an optical record carrier having an information layer, comprising
a radiation source for generating a radiation beam wherein the radiation beam has a polarization,
a radiation detector,
an optical system having a forward optical path and a forward magnification comprising an objective lens for focusing said radiation beam onto the information layer, and a return optical path having a return magnification for transmitting the radiation beam reflected by the information layer to the radiation detector,
wherein the device further comprises a means for varying or adjusting the return magnification in dependence on said radiation beam polarization without substantially affecting the forward magnification.

18. The device of claim 17, further comprising a beam splitter for separating the radiation beam emitted by the radiation source from the radiation beam reflected by the information layer.

19. The device of claim 18, wherein the means is located between the beam splitter and the radiation detector.

20. The device of claim 18, wherein the means has an adjustable focal length.

21. The device of claim 18, wherein the means is axially movable along the return optical path.

22. An optical scanning device for scanning an optical record carrier having an information layer, comprising
a radiation source for generating a radiation beam,
a radiation detector,
an optical system having a forward optical path and a forward magnification comprising an objective lens for focusing said radiation beam onto the information layer, and a return optical path having a return magnification for transmitting the radiation beam reflected by the information layer to the radiation detector, wherein the device further comprises an electrowetting lens for varying or adjusting the return magnification without substantially affecting the forward magnification.

23. The device of claim 22, further comprising a beam splitter for separating the radiation beam emitted by the radiation source from the radiation beam reflected by the information layer.

24. The device of claim 23, wherein the electrowetting lens is located between the beam splitter and the radiation detector.

25. The device of claim 22, wherein the electrowetting lens has an adjustable focal length.

26. The device of claim 22, wherein the electrowetting lens is axially movable along the return optical path.

27. An optical scanning device for scanning an optical record carrier having an information layer, comprising
- a radiation source for generating a radiation beam,
- a radiation detector,
- an optical system having a forward optical path and a forward magnification comprising an objective lens for focusing said radiation beam onto the information layer, and a return optical path having a return magnification for transmitting the radiation beam reflected by the information layer to the radiation detector,
- wherein the device further comprises a variable optical device comprising liquid crystal materials for varying or adjusting the return magnification without substantially affecting the forward magnification.

28. The device of claim 27, further comprising a beam splitter for separating the radiation beam emitted by the radiation source from the radiation beam reflected by the information layer.

29. The device of claim 28, wherein the variable optical device comprising said liquid crystal materials is located between the beam splitter and the radiation detector.

30. The device of claim 28, wherein the variable optical device comprising said liquid crystal materials has an adjustable focal length.

31. The device of claim 28, wherein the variable optical device comprising said liquid crystal materials is axially movable along the return optical path.

32. An optical scanning device for scanning an optical record carrier having an information layer, comprising
- a first radiation source for generating a first radiation beam at a first wavelength,
- a second radiation source for generating a second radiation beam at a second wavelength,
- a radiation detector whose dimensions are optimized to the dimensions of a radiation spot when operating in said optimized mode,
- an optical system having a forward optical path and a forward magnification comprising:
    (a) a first beam splitter for separating the first radiation beam emitted by the first radiation source from a first reflected radiation beam reflected by the information layer,
    (b) a second beam splitter for separating the second radiation beam emitted by the second radiation source from a second reflected radiation beam reflected by the information layer,
    (c) a multi-disc format compatible objective lens for independently focusing said first and second radiation beams onto the information layer, and
    (d) a return optical path having a return magnification for transmitting the radiation beam reflected by the information layer to the radiation detector, wherein the return optical path is optimized for one of said first and second radiation sources,
    (e) means for varying or adjusting the return magnification without substantially affecting the forward magnification, wherein said means operates in one of said optimized or non-optimized mode, and wherein said means reduces the return optical path magnification in said non-optimized mode.

* * * * *